(12) United States Patent
Cote

(10) Patent No.: US 6,179,007 B1
(45) Date of Patent: Jan. 30, 2001

(54) REINFORCED, FLEXIBLE HOSE WITH BUILT-IN HANDLE

(75) Inventor: Sylvain Jean-Francois Cote, Canton de Granby (CA)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 09/499,482

(22) Filed: Feb. 7, 2000

(51) Int. Cl.$^7$ .................................................. F16L 3/00
(52) U.S. Cl. .................... 138/106; 138/124; 138/126; 138/178
(58) Field of Search .................... 138/106, 124, 138/126, 178; 16/110.1, 111.1

(56) References Cited

U.S. PATENT DOCUMENTS

| | | |
|---|---|---|
| 130,167 | 8/1872 | Weaver . |
| 404,780 | 6/1889 | Dowd . |
| 732,582 | 6/1903 | McKay . |
| 2,568,039 | 9/1951 | Torell ........................................ 299/58 |
| 3,367,370 | * 2/1968 | Sherlock ................................. 138/178 |
| 3,431,947 | * 3/1969 | Hines ....................................... 138/109 |
| 3,511,281 | * 5/1970 | Dunlap, Jr. et al. .................... 138/178 |
| 3,599,700 | * 8/1971 | Cutillo et al. .......................... 157/1.21 |
| 4,026,330 | 5/1977 | Dunn ....................................... 138/103 |
| 4,237,174 | * 12/1980 | Lagardere et al. ..................... 138/168 |
| 4,514,103 | * 4/1985 | Wise et al. .............................. 138/178 |
| 4,734,305 | * 3/1988 | Sugimoto et al. ...................... 138/126 |
| 5,445,191 | * 8/1995 | Green et al. ............................ 138/124 |
| 5,891,114 | * 4/1999 | Chien et al. ............................ 138/123 |

* cited by examiner

Primary Examiner—James Hook
(74) Attorney, Agent, or Firm—Nancy T Krawczyk

(57) ABSTRACT

A flexible hose 10 having a built-in handle 20. The hose 10 has at least three layers including a first elastomeric layer 12, a second elastomeric layer 16, and at least one reinforcing layer 14. At least one handle 20 is affixed to at least one of the respective reinforcing layers 14. The handle 20 at least partially extends radially outwardly of the external surface 18 of the hose 10. In a preferred embodiment, the handle 20 is made from flexible material.

1 Claim, 5 Drawing Sheets

REINFORCED, FLEXIBLE HOSE WITH BUILT-IN HANDLE

TECHNICAL FIELD

This invention relates to reinforced, flexible hoses and, more particularly, to reducing the difficulty of maneuvering such hoses.

BACKGROUND ART

Many reinforced, flexible hoses have at least three layers, at least one being a reinforcing layer. The reinforcing layer is typically either a layer of braided or woven cord or a helically wound reinforcement. In making the reinforced, flexible hose, a first elastomeric layer is formed into the shape of a tube by applying elastomeric material to a mandrel. This first elastomeric layer is generally smooth but may be textured or contoured. Another elastomeric layer forms at least a portion of the external surface of the hose. The external surface of the hose may be a smooth surface, may be textured, or may have a helical winding.

Reinforced, flexible hoses are very durable, making them very useful in certain applications, such as on tank trucks. However under certain conditions, the hoses can be very difficult to control and maneuver. For example, when the external surface of the hose becomes moist, it becomes very slippery and the hose becomes difficult to maneuver. This is especially true when larger diameter hoses with smooth external surfaces are being used.

To help in controlling and maneuvering a hose, many operators will add an external handle to the hose. Generally, these handles are clasped to the external surface of the hose. When clasping a handle to a hose, care must be taken to assure the handle does not slip on the external surface of the hose. As a result, the handle must be either attached so that it firmly squeezes the hose or the handle clasp must contain grips that dig into the external surface of the hose to hold the handle in place.

Attaching a handle in either of these ways may result in damage to the hose. Attaching the handle to firmly squeeze the hose may provide excess strain in a concentrated area of the hose. Attaching a handle containing grips may damage the hose because the grips may dig into the hose layers and may result in excess stress in a concentrated area of the hose. Additionally, the edges of the clasp when tightened onto the hose may cut into the hose surface causing further damage to the hose. An operator using a hose having an external handle may be injured as a result of this damage to the hose. Since most reinforced, flexible hoses are used in either pressure or vacuum applications, the damage to the hose may reduce the pressure or vacuum tolerance of the hose. As a result, the likelihood of hose failure during operation increases. Hose failure during a pressure or vacuum operation may result in injury to the operator, especially when a harmful product is being transported through the hose.

An addition problem resulting from adding an external handle is that the clasps reduce the flexibility of the hose in the area where the clasp is attached. Since the clasp is likely a solid ring that extends around the circumference of the hose, the flexibility of the hose is reduced at the location of this solid ring.

SUMMARY OF THE INVENTION

This invention relates to a hose having a built-in handle. The flexible hose has at least three layers including a first elastomeric layer, a second elastomeric layer, and a reinforcing layer. At least one built-in handle is affixed to the respective reinforcing layer. The handle at least partially extends radially outward of the external surface of the hose.

DEFINITIONS

For ease of understanding this disclosure, the following terms are disclosed.

"Axial" and "axially" means lines or directions that are parallel to the axis forming the center of the tube of the hose.

"Circumferential" or "circumferentially" means lines or directions extending around the surface of the hose in a direction perpendicular to the axis forming the center of the tube of the hose.

"Elastomer" means a resilient material capable of recovering size and shape after deformation.

"Radial" or "radially" are used to mean directions toward or away from the central axis of the hose.

"Yarn" means a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); or (5) a narrow strip of material with or without twist, such as paper.

BRIEF DESCRIPTION OF DRAWINGS

The invention will be described by way of example and with reference to the accompanying drawings in which.

DETAILED DESCRIPTION OF THE INVENTION

Figure 1:
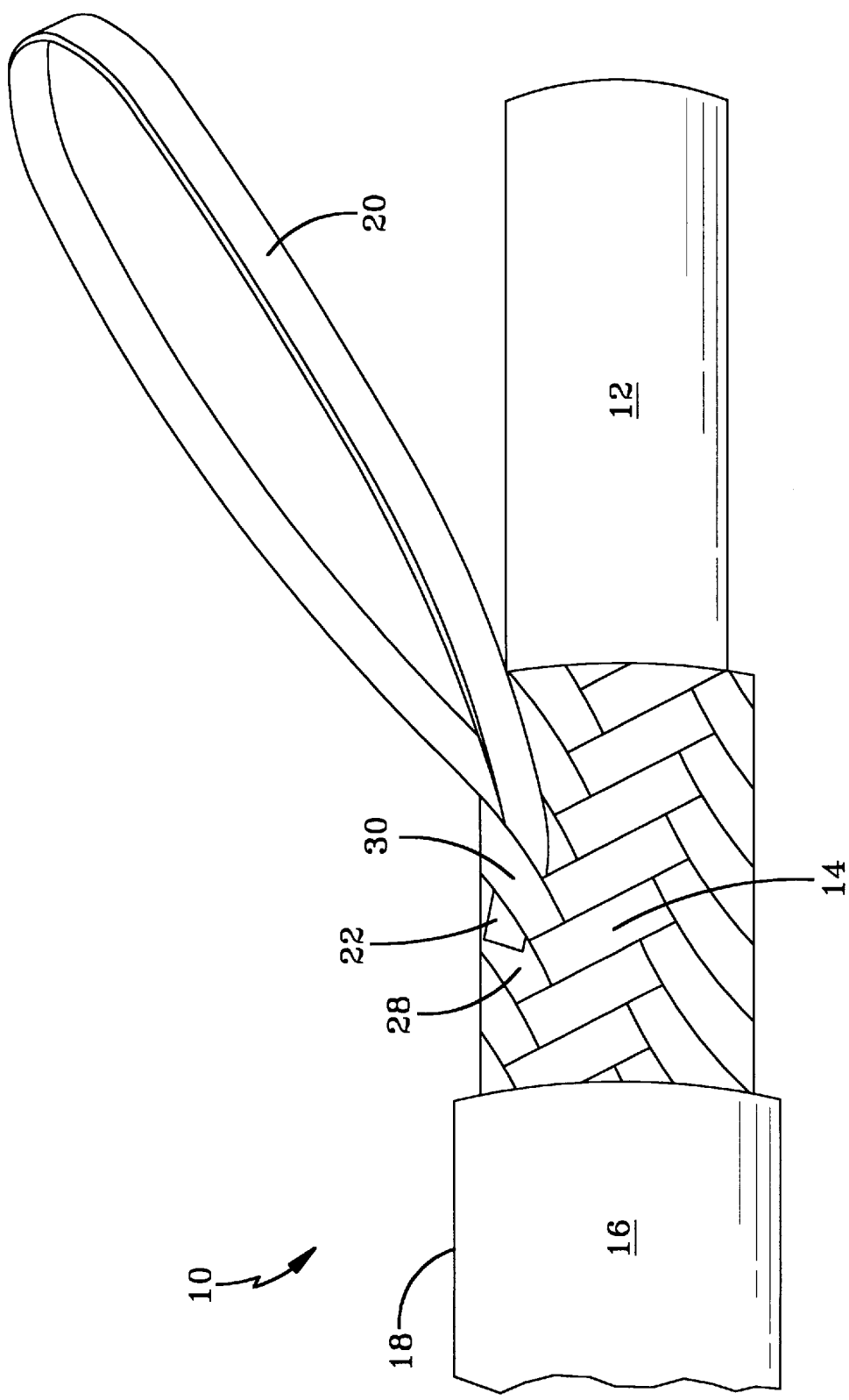
FIG. 1 is shows an embodiment of the invention.

FIG. 1 shows an embodiment of the reinforced, flexible hose 10 of this invention. The hose 10 has at least three layers. The first elastomeric layer 12 forms the tube of the hose 10. The first elastomeric layer 12 is formed by applying the elastomer to a mandrel. In this embodiment, the reinforcing layer 14 is applied directly over the first elastomeric layer 12. The reinforcing layer 14 provides support for the hose 10 and usually has at least one fiber or filament or is made of a stronger elastomeric material than the first and second elastomeric layers 12, 16. The reinforcing layer 14 depicted in FIG. 1 is a braided layer. This braided layer may consist of a plurality of intermeshing strands of either metallic fibers, non-metallic fibers, such as yarn, or a combination of both. The third layer depicted in FIG. 1 is the second elastomeric layer 16. The second elastomeric layer 16 forms at least a portion of the external surface 18 of the flexible hose 10. In this embodiment, the second elastomeric layer 16 is smooth and forms the entire external surface 18 of the hose 10.

The flexible hose 10 has at least one built-in handle 20. The built-in handle 20 is affixed to the reinforcing layer 14. The built-in handle depicted in FIG. 1 is a flexible cloth handle that is affixed to the reinforcing layer 14 by interlocking an end 22 of the handle 20 between respective braids 24 of the reinforcing layer 14. Although the end 22 of the handle 20 is interlocked in this embodiment, the handle 20 may be affixed to the reinforcing layer 14 by other means. In a preferred embodiment, the handle 20 is both interlocked between respective braids 24 and further affixed to the reinforcing layer 14 by an adhesive filler.

Figure 2:
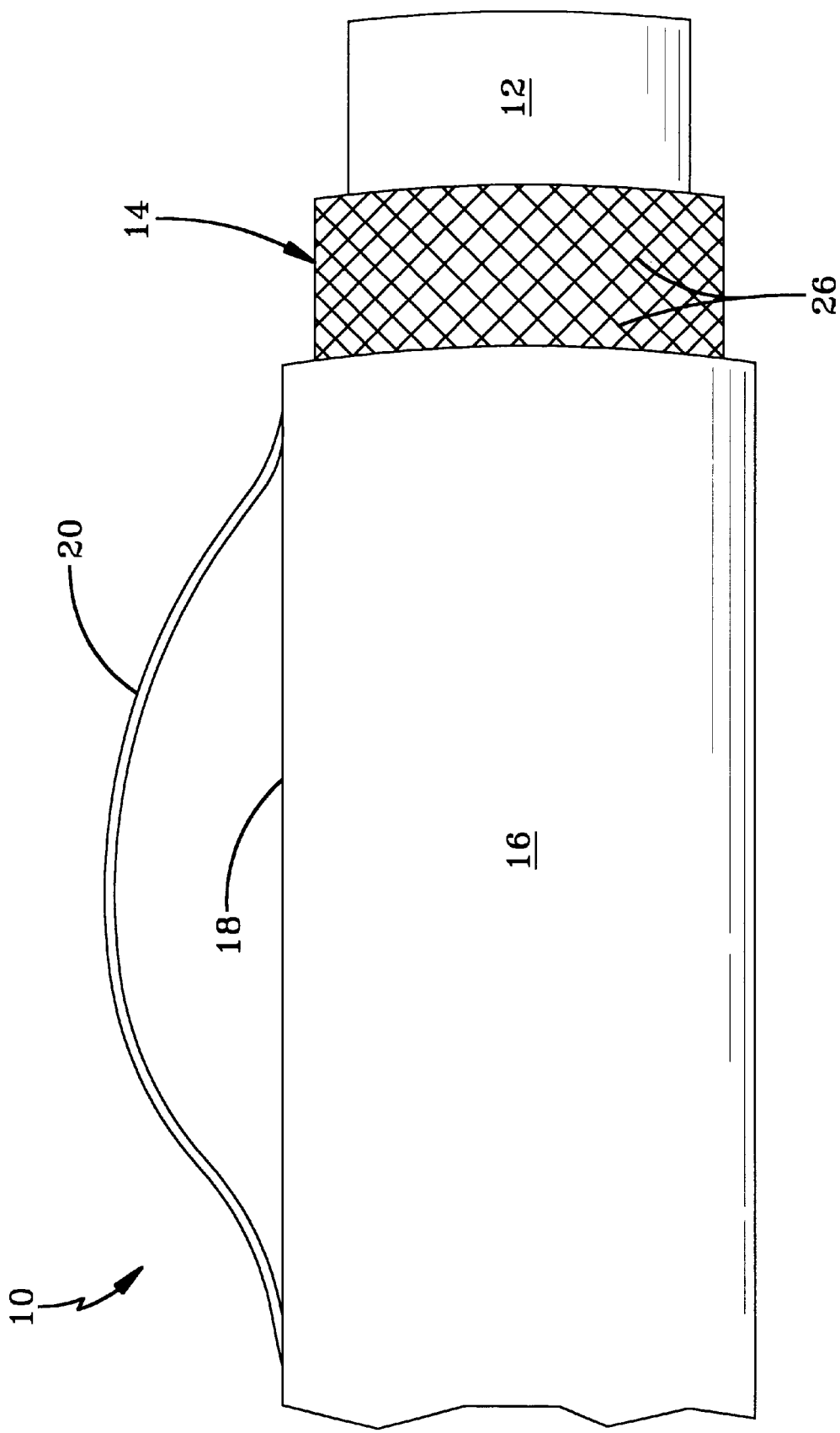
FIG. 2 is shows a second embodiment of the invention.

FIG. 2 depicts a second embodiment of the flexible hose 10 of the invention. The reinforcing layer 14 of this hose 10 is made of a plurality of fibers 26, such as yarn, woven together. The handle 20 is affixed to the woven reinforcing layer 14 by interlocking an end 22 between adjacent fibers 26. This embodiment shows a handle 20 that is affixed to the reinforcing layer 14 in two locations. As shown, the handle 20 at least partially extends radially outward of the external surface 18 of the hose 10. This handle 20 may be made of either rigid or flexible material. Flexible material is preferred as it will not restrict the flexibility of the hose 10 over the length of the handle 20 as would occur with a rigid handle 20.

Figure 3:
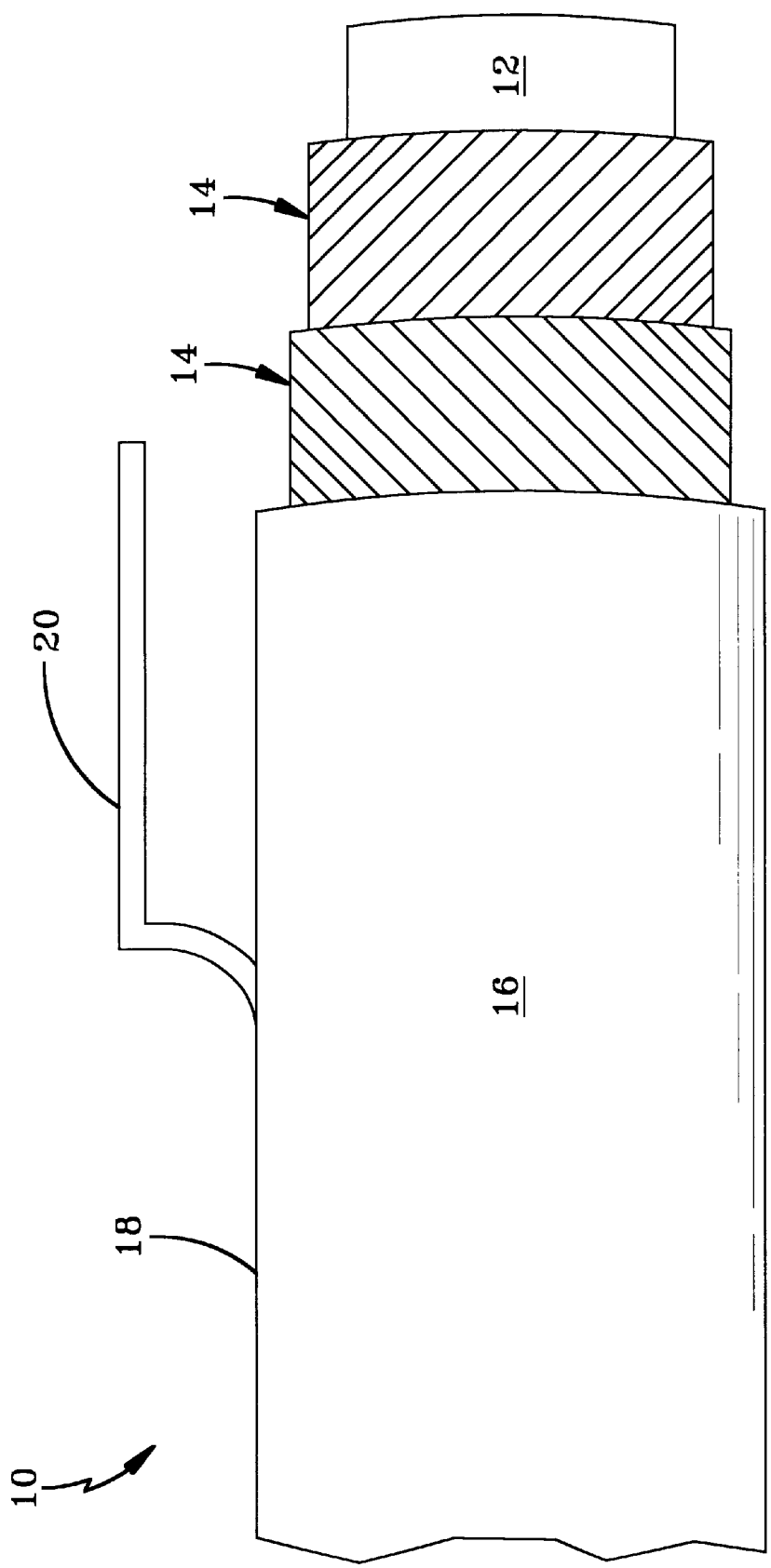
FIG. 3 is shows a third embodiment of the invention.

FIG. 3 depicts a third embodiment of the invention. The flexible hose 10 depicted in this embodiment has a rigid handle 20 affixed in one location of at least one of the reinforcing layers 14. The rigid handle 20 runs axially along the hose 10. When an axial extending, rigid handle 20 is used, it is preferred to affix the handle 20 to the reinforcing layer 14 in only one location so that the flexibility of the hose 10 is not reduced over the length of the handle 20. If a rigid handle 20 is used that runs circumferentially around the hose 10, multiple locations of attachment can be used without dramatically reducing the flexibility of the hose 10. The reinforcing layers 14 depicted in FIG. 3 consist of a helically wound cord located between the first and the second elastomeric layers 12, 16. Typically, when a helically wound cord is used in a reinforcement layer 14, a second reinforcement layer 14 consisting of a helically wound cord applied in an opposite direction is used to provide symmetry for the hose 10.

Figure 4:
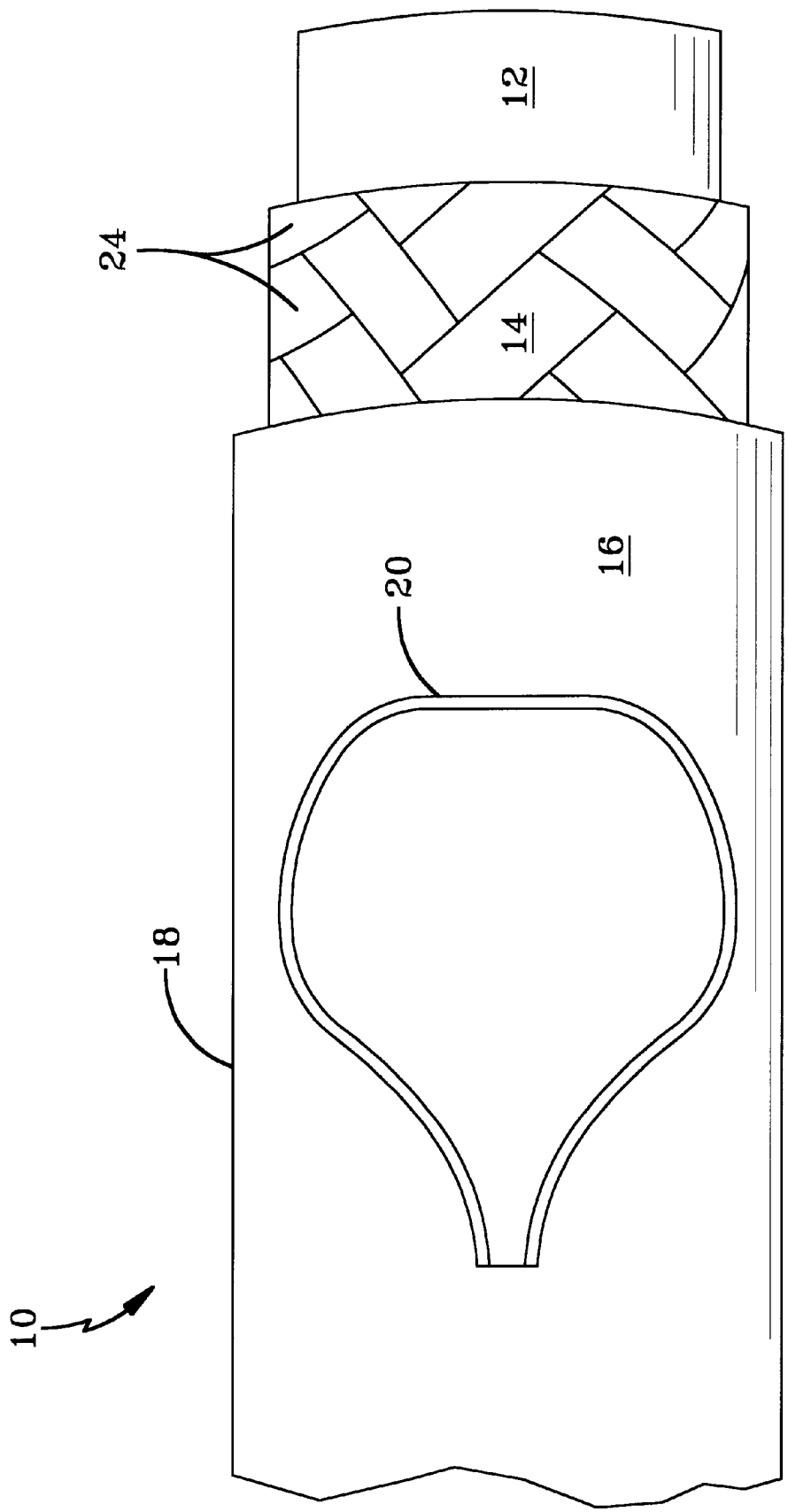
FIG. 4 shows a fourth embodiment of the invention.

FIG. 4 depicts a fourth embodiment of the invention. This embodiment has a handle 20 that is shaped like a hook. This handle 20 can be made from either rigid or flexible material. The handle 20 depicted has two, circumferentially separated locations where it is affixed to the reinforcing layer 14. The handle 20 of this embodiment may be affixed to the reinforcing layer 14 in one or more circumferentially separated locations without dramatically affecting the flexibility of the hose 10. This handle 20 may be used as a gripping device or a flexible grip may be attached to this handle 20.

Figure 5:
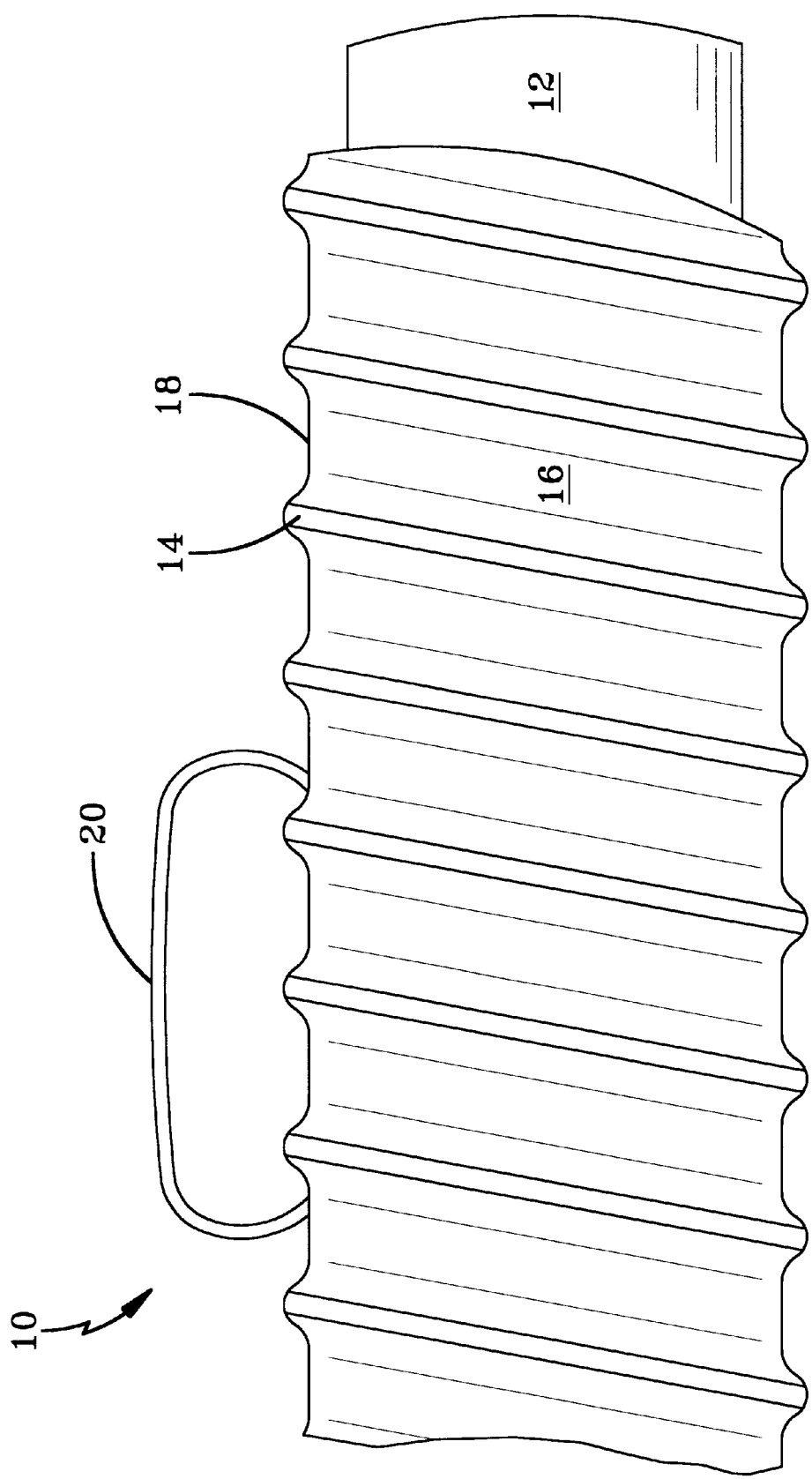
FIG. 5 shows a fifth embodiment of the invention.

FIG. 5 depicts a fifth embodiment of the invention. Unlike the previous embodiments of the invention, this embodiment has the reinforcing layer 14 applied to the external surface 18 of the flexible hose 10. The reinforcing layer 14 is a helically wound layer formed from either a stronger elastomeric material or a filament encased in an elastomeric material. The handle 20 is affixed to the reinforcing layer by applying the helical layer over each respective end 22 of the handle 20. An adhesive filler can be used to aid in affixing the handle 20 to the reinforcing layer 14. Again, a flexible handle 20 is preferred so that the flexibility of the hose 10 over the length of the handle 20 is not reduced. If the embodiment shown if FIG. 5 is built with more than one reinforcing layer, the handle 20 may be attached to either the outer, helically wound reinforcement layer or the inner reinforcement layer. Although the hose 10 depicted in FIG. 5 has the reinforcing layer 14 applied to the external surface 18 of the hose 10, those skilled in the art will understand that a reinforcing layer of this construction can also be applied between the first and second elastomeric layers 12, 16.

Although each embodiment of the flexible hose 10 shown contains only three layers, hoses with additional layers are also contemplated by this invention. If an additional layer is another reinforcing layer 14, the handle 20 may be affixed to each reinforcing layer to provide additional support.

The method of manufacturing the flexible hose 10 of this invention includes the steps of: (i) applying a first elastomeric layer 12 on a mandrel; (ii) applying at least one reinforcing layer 14; (iii) affixing at least one handle 20 to at least one of the respective reinforcing layers 14 such that the respective handle 20 at least partially extends radially outward of the external surface 18 of the hose 10; and (iv) applying a second elastomeric layer 16 to form at least a portion of the external surface 18 of the hose 10. The step of applying at least one reinforcing layer 14 may consist of adding a braided reinforcing layer, a woven reinforcing layer, or a helically wound reinforcing layer.

The hoses 10 depicted in FIG. 1 through FIG. 4 are all made by adding the reinforcing layer 14 prior to adding the second elastomeric layer 16. The hose 10 in FIG. 5 is made by adding the second elastomeric layer 16 prior to the reinforcing layer 14. In the manufacture of each type of hose 10, care must be taken to assure that the handle 20 at least partially extends radially outward from the external surface 18 of the hose 10. To interlock the end 22 of the handle 20 between adjacent braids 24 as shown in FIG. 1, two methods can be used. In the first method, the handle 20 must be laid on the first elastomeric layer 12 so that the end 22 partially overlaps a first braided section 28. A second braided section 30 is then wrapped over the handle 20. After the second braided section 30 is wrapped over the handle 20, the handle 20 must be moved so that it rests on the reinforcing layer 14 and the remaining braids 24 can be applied without restricting the handle 20. In the second method, the reinforcing layer 14 is added up to the desired location of the handle 20. The handle 20 is laid over the reinforcing layer 14 so that the end 22 rests on the first elastomeric layer 12 while the remainder of the handle 20 lays on the reinforcing layer 14. The remaining braids 24 are then added to the reinforcing layer 14 and the end 22 is buried underneath the reinforcing layer 14. Adding the second elastomeric layer 16 may require maneuvering of the handle 20 in a method similar to those described above or hand placing the elastomeric material in the area around the handle 20.

After the final layer has been applied to the hose 10, the entire hose 10 is wrapped with a curing tape. The hose 10 is cured in an autoclave or a similar curing device at 300° F., 148° C., for ninety minutes, or another proper curing temperature and time. After curing, the curing tape is removed and the hose 10 may be cut to a desired length so that the respective handle 20 is in the desired location.

The hose 10 having at least one built-in handle 20 reduces the difficulty of maneuvering the hose 10 while eliminating excess stresses and reduced flexibility that are associated with the addition of an external handle.

What is claimed is:

1. A flexible hose (10) having at least three layers including a first elastomeric layer (12), a second elastomeric layer (16) and at least one reinforcing layer (14), the second elastomeric layer (16) forming at least a portion of the external surface (18) of the hose (10), the hose (10) being characterized in that:

at least one built-in handle (20) is affixed to at least one of the respective reinforcing layers (14), the handle (20) at least partially extending radially outwardly of the external surface (18) of the hose (10).

* * * * *